(12) United States Patent
Hill et al.

(10) Patent No.: US 10,350,773 B2
(45) Date of Patent: Jul. 16, 2019

(54) RAZORS AND RAZOR BLADE CARTRIDGES AND METHODS OF MANUFACTURING THEREFORE

(71) Applicant: SOCIETE BIC, Clichy (FR)

(72) Inventors: Andy Hill, Beaconsfield (GB); Andy Honour, Beaconsfield (GB); Jeff Motley, Beaconsfield (GB)

(73) Assignee: SOCIETE BIC, Clichy (FR)

( * ) Notice: Subject to any disclaimer, the term of this patent is extended or adjusted under 35 U.S.C. 154(b) by 676 days.

(21) Appl. No.: 15/110,407

(22) PCT Filed: Nov. 26, 2013

(86) PCT No.: PCT/EP2013/074779
§ 371 (c)(1),
(2) Date: Jul. 7, 2016

(87) PCT Pub. No.: WO2014/108241
PCT Pub. Date: Jul. 17, 2014

(65) Prior Publication Data
US 2016/0354939 A1    Dec. 8, 2016

(30) Foreign Application Priority Data
Jan. 9, 2013    (GB) .................................. 1300372.8

(51) Int. Cl.
*B26B 21/40*    (2006.01)
*C09D 133/24*    (2006.01)
(Continued)

(52) U.S. Cl.
CPC ........ *B26B 21/4012* (2013.01); *B26B 19/384* (2013.01); *B26B 19/3853* (2013.01); *B26B 19/3893* (2013.01); *B26B 21/222* (2013.01); *B26B 21/4068* (2013.01); *B26B 21/44* (2013.01); *C08J 7/16* (2013.01); *C09D 133/24* (2013.01); *C08J 2323/06* (2013.01); *C08J 2355/02* (2013.01); *C08J 2375/04* (2013.01);
(Continued)

(58) Field of Classification Search
None
See application file for complete search history.

(56) References Cited

U.S. PATENT DOCUMENTS 3,815,233 A * 6/1974 Carroll ................. B26B 21/165
16/422
4,170,821 A * 10/1979 Booth ...................... B05D 5/08
30/41
(Continued)

FOREIGN PATENT DOCUMENTS

| GB | 2 024 082 | 1/1980 |
| GB | 2 480 916 | 12/2011 |

OTHER PUBLICATIONS

International Search Report of PCT/EP2013/074779 dated Feb. 13, 2014.

*Primary Examiner* — Hwei-Siu C Payer
(74) *Attorney, Agent, or Firm* — Polsinelli PC

(57) ABSTRACT

A razor blade cartridge having at least one razor blade and a housing made from a polymer material and having an outer surface where at least part of the outer surface of the housing is coated with a hydrophilic material, and where the outer surface of the housing includes undulations on at least a portion of the coated part.

34 Claims, 10 Drawing Sheets

Figure 1:
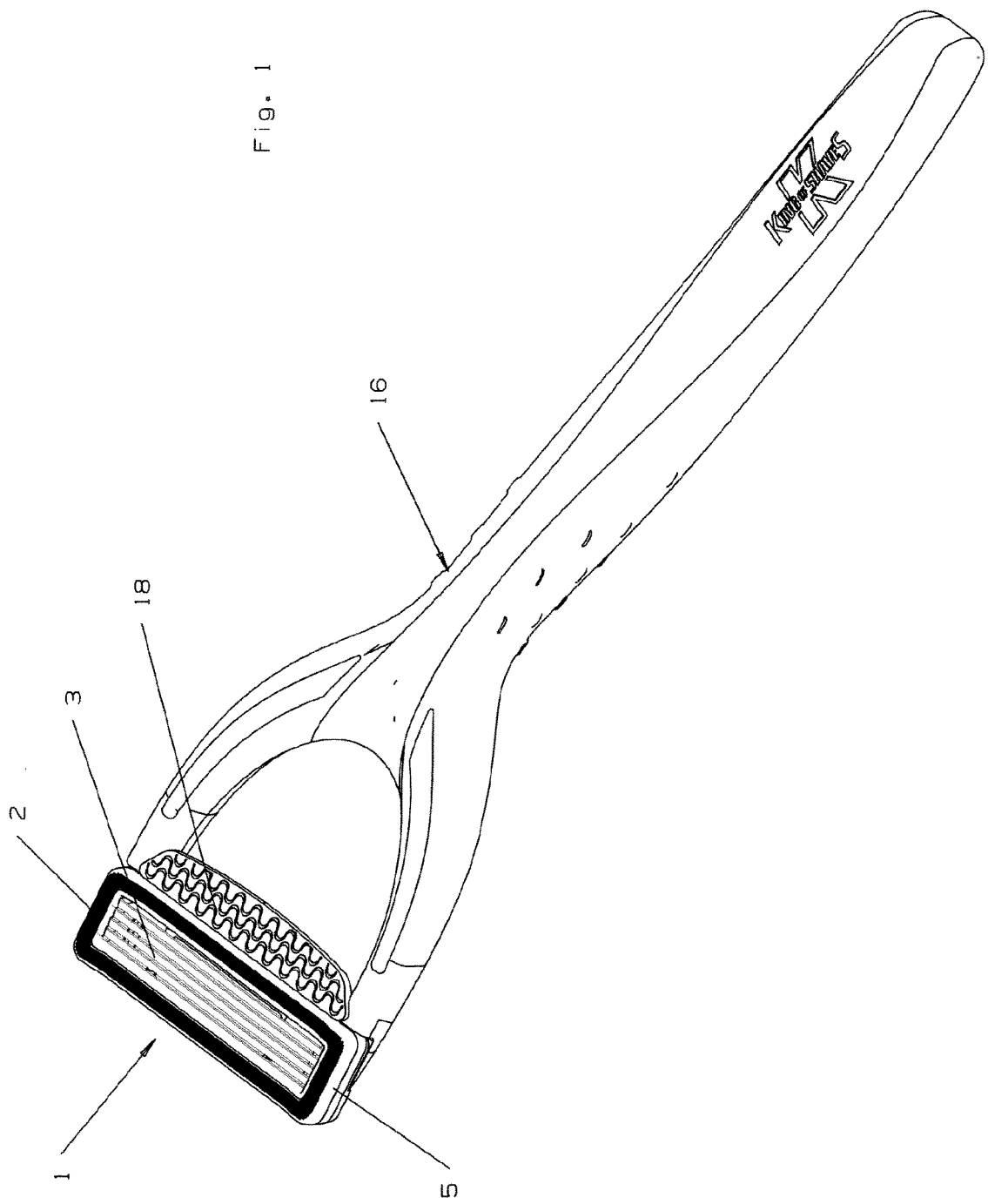

(51) Int. Cl.
*B26B 19/38* (2006.01)
*C08J 7/16* (2006.01)
*B26B 21/22* (2006.01)
*B26B 21/44* (2006.01)

(52) U.S. Cl.
CPC ........ *C08J 2377/00* (2013.01); *C08J 2433/24* (2013.01)

(56) References Cited

U.S. PATENT DOCUMENTS

| | | | |
|---|---|---|---|
| 4,875,287 A | | 10/1989 | Walter et al. |
| 5,005,287 A | * | 4/1991 | Ritter ........................ B05D 5/08 30/41 |
| 5,618,887 A | * | 4/1997 | Bamford ............... A61L 29/041 525/279 |
| 5,689,883 A | * | 11/1997 | Ortiz ................... B26B 21/4018 30/34.2 |
| 7,681,314 B2 | * | 3/2010 | Follo ..................... B26B 21/222 30/34.2 |
| 9,802,328 B2 | * | 10/2017 | Witkus ................ B26B 21/4018 |
| 2006/0064875 A1 | * | 3/2006 | Follo ..................... B26B 21/225 30/34.1 |
| 2006/0070240 A1 | * | 4/2006 | Fischer ................. B26B 21/222 30/50 |
| 2009/0071006 A1 | * | 3/2009 | Bruno ..................... B26B 21/44 30/34.2 |
| 2009/0071007 A1 | * | 3/2009 | Bruno ..................... B26B 21/44 30/34.2 |
| 2013/0008029 A1 | * | 1/2013 | Hill .................... B26B 21/4068 30/32 |
| 2016/0354939 A1 | * | 12/2016 | Hill .................... B26B 21/4012 |

\* cited by examiner

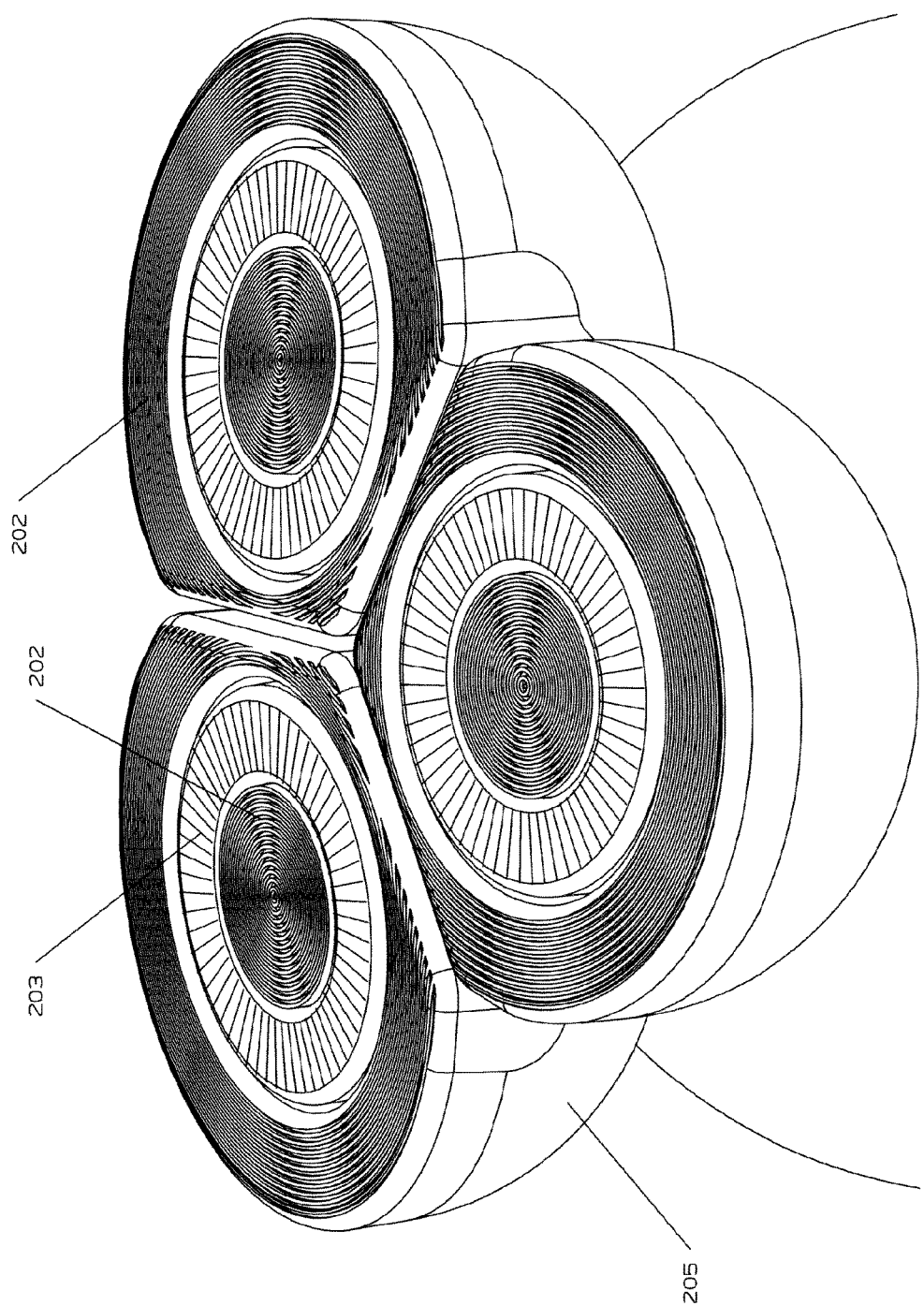

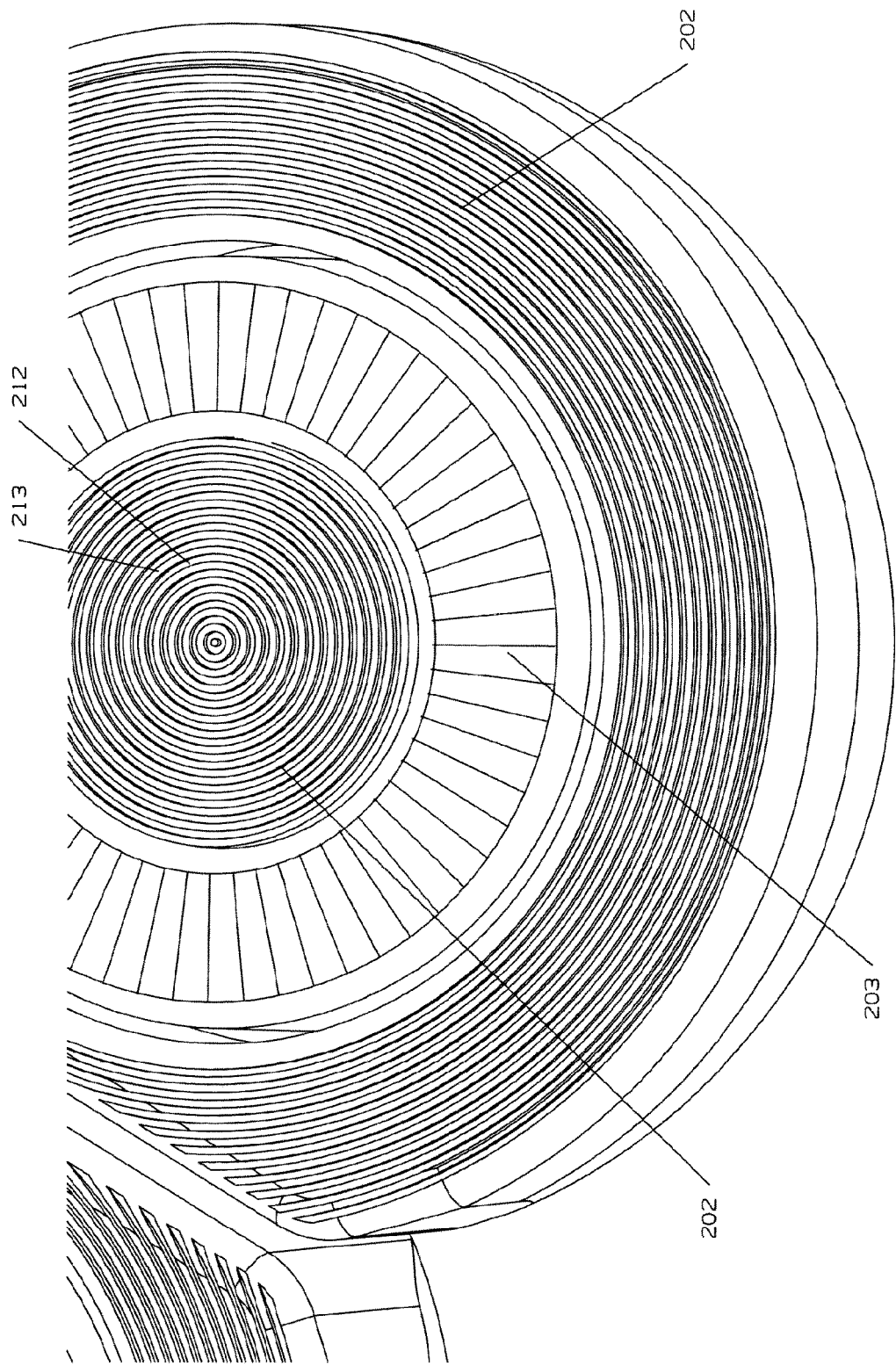

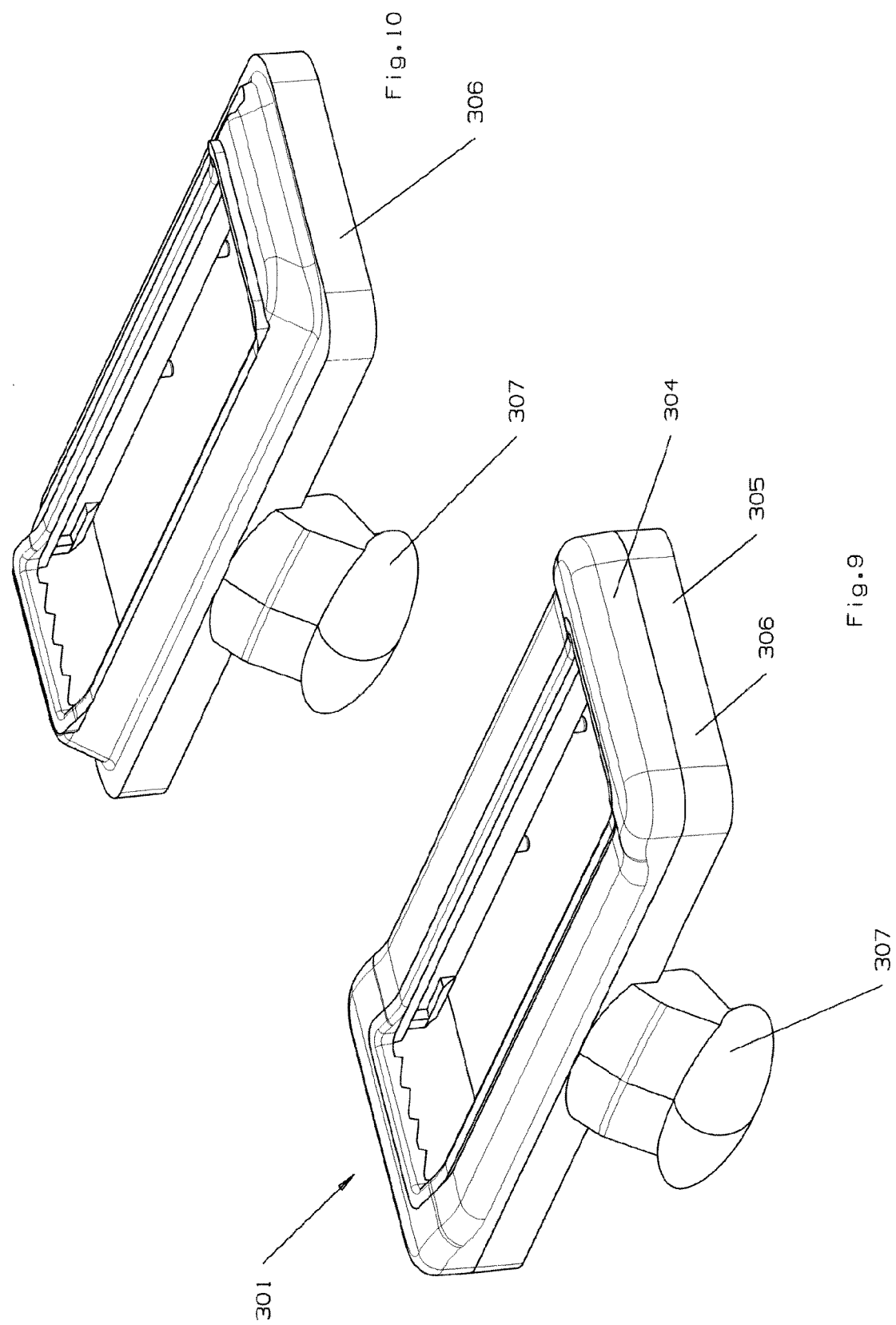

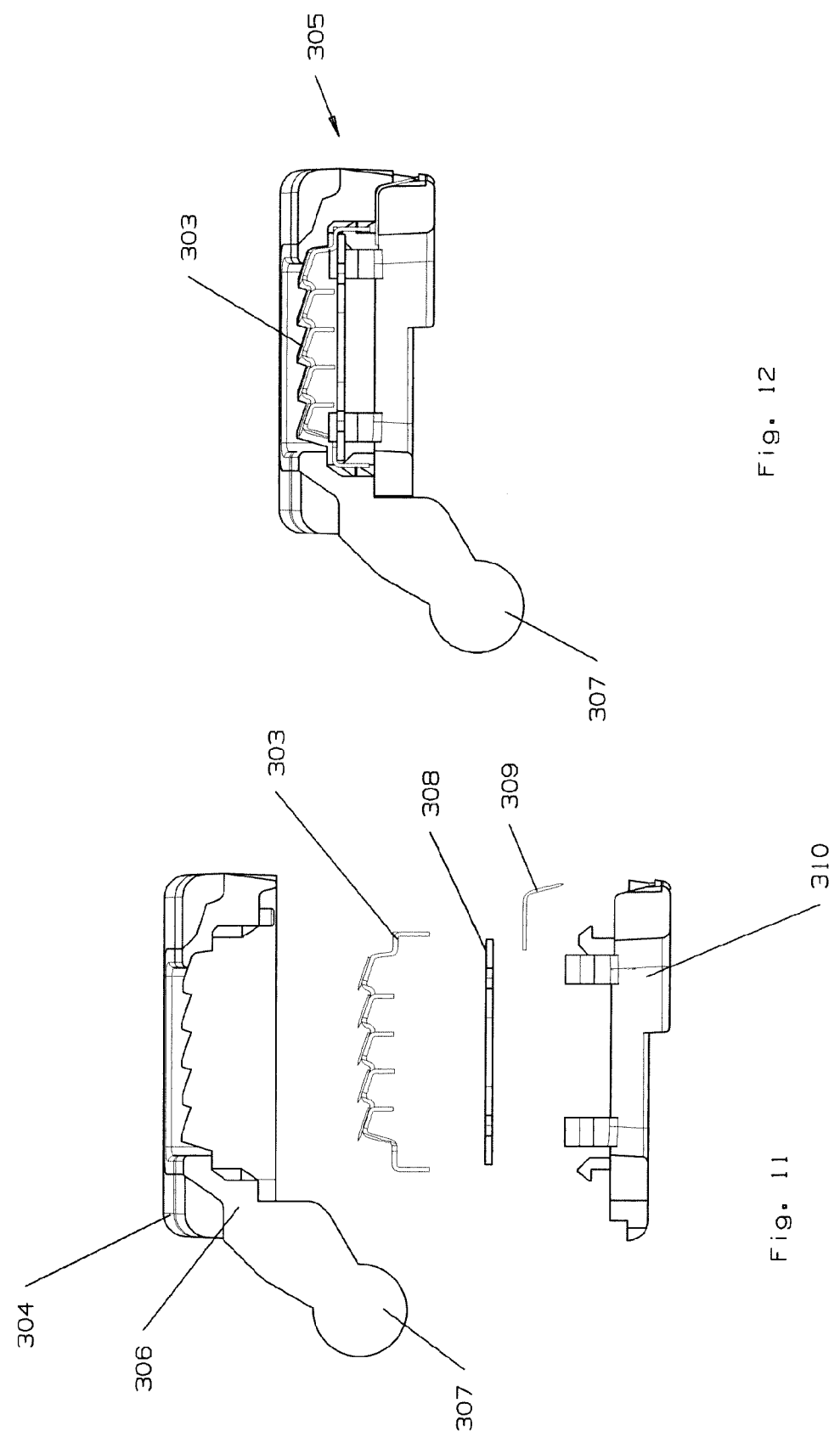

RAZORS AND RAZOR BLADE CARTRIDGES AND METHODS OF MANUFACTURING THEREFORE

This application is a national stage application of International Application No. PCT/EP2013/074779, filed on Nov. 26, 2013, which claims priority to GB Application No. 1300372.8, filed on Jan. 9, 2013, and the entire contents of which are incorporated herein by reference.

FIELD OF INVENTION

The embodiments of the present invention relates to an improved razor blade cartridge and a method of manufacture thereof.

BACKGROUND OF THE INVENTION

There are a number of known prior art devices which endeavor to provide lubricious properties to the surfaces of a shaving cartridge. For example U.S. Pat. No. 5,005,287 assigned to Wilkinson Sword GmbH describes a process for forming and applying a hydrophilic coating, which is highly slideable when wet, to a plastic or metal part either directly, or indirectly via plastic film, to a safety razor or razor blade unit, in which a solution containing a water-soluble polymer is applied to the plastic or metal part and is cured. The embodiments of the present invention also relates to a razor blade unit comprising a blade platform for at least one razor blade, a surface for slidably engaging the skin of a user and a coating on the surface for increasing the slideability of the surface. The coating comprises a water-soluble polymer or copolymer of poly-N-vinylpyrrolidone, at least one radically polymerizable vinyl monomer and a photoinitiator.

A further razor blade cartridge is disclosed in U.S. Pat. No. 5,056,221, also to Wilkinson Sword GmbH. In this disclosure a razor blade unit comprising a support for at least one razor blade and a surface for slidably engaging the skin of a user, and a xerogel on the surface. A process for making a sliding surface on a razor blade unit comprising applying a solution of polyurethane, a water-soluble plastic and a solvent to a surface of the razor blade unit which engages the skin of a user during shaving, and evaporating the solvent to form the sliding surface. The preferred embodiment is to provide the coating on to a strip and to attach the strip to the desired part of the razor blade cartridge. U.S. Pat. No. 4,875,287 to Hydromer Inc. discloses a similar application method.

A more preferred method of applying lubricious surfaces onto razor blade cartridges however has been by securing a coated strip as a physically fixed insert in the razor blade cartridge. This prevents dislodgement of the strip and also is preferable from the point of view of manufacture of each individual cartridge. One such cartridge is disclosed in EP 0715561 to Gillette which describes a shaving unit including a composite that has a surface for engaging the user's skin. The composite contains a water-insoluble resin, a shaving aid, and a water-swellable polymer.

EP 1 055 491 to Warner-Lambert discloses cartridges in which a plastics insert is provided with a lubricious coating. It discloses so-called "Glide" strips for wet shave razors in which the glide strips comprise a mixture of polyurethane and polyvinylpyrrolidone in a ratio of less than 3:1. Glide strips having a ratio within this range provide the benefit of allowing an additive, such as aloe or vitamin E acetate, to be incorporated within the strip in a manner so that it will be capable of depositing the material from the strip on the user's skin during usage. This will provide the benefit to the user of applying a material directly to the skin to enhance the shaving experience. A further embodiment provides a glide strip having a PVP/PUR blend of a certain colour and ratio, which ratio will allow the PVP/PUR blend to erode as the razor is used. Upon the erosion of the PVP/PUR blend, the underlying material, of a different colour than the PVP/PUR, will be exposed and provide an indication to the user that the razor should be replaced.

A disadvantage of these coatings is that they are not very hard wearing and tend to become worn before the full life of the blades is used and this sometimes results in a user disposing of the razor blade cartridge prematurely.

There are numerous patents concerned with the various orientations of the shaving aid strips with respect to the blades as well as to the various active ingredients within the shaving aids leaching out. One such example is U.S. Pat. No. 6,298,559 by Gillette directed to a razor cartridge with a solid polymeric shaving aid strip. The razor cartridge has a solid polymeric shaving aid strip having an upper exposed surface which contacts the skin during shaving. The shaving aid strip includes a first exposed lengthwise-extending portion containing a lubricious water-soluble polymer and an adjacent, second exposed lengthwise-extending portion containing a lubricious water-soluble polymer. The first portion contains a greater amount of the lubricious water-soluble polymer than the second portion, and the first portion is adapted to wear at a faster rate than the second portion during shaving. This construction enables the strip to release more of the lubricious water-soluble polymer for a longer time period (i.e. for more shaves) than conventional shaving aid strips This additional variability of lifetime makes it difficult to balance the respective lifetimes of the shaving aid on the one hand and the blades edges on the other which due to the varying manufacturing tolerances statistically results in a number of blade cartridge being discarded before one of the shaving aid or the blade edge is fully used.

In addition these types of blade cartridges with the shaving aid strips located in close proximity to the blades result in the entrapment of shaving debris and make the wash through of the debris a more difficult task for the user. In order to wash a razor blade cartridge after use a user is inclined to hold the cartridge under a running tap, so the better the wash through properties of the razor cartridge the less water is consumed.

A further disadvantage of these razor blade cartridges is that they can result in variability of the level of friction during the course of the use of the razor cartridge. This can result from variabilities in the use pattern of the user, the extent of humidity in the bathroom, the relative hardness of the water supply as well as the differences in the beard type and the type and amount of lubricant the user applies to the face. All of these factors can affect the extent of leaching out of the shaving aid active ingredient and general wear and degradation characteristics of the saving aid strip of these conventional razor cartridges.

It is an objective of the present invention to overcome the above disadvantages.

It is therefore an objective of the present invention to provide a razor cartridge which has highly lubricious properties which remain more constant throughout the life of the razor cartridge than current razor cartridges.

It is an objective of the present invention to provide improved razor blades, razor blade cartridges and methods of manufacture therefore in which the friction properties do not become ineffective before the blade edge has dulled.

It is a further objective of the present invention to provide improved razor blades, razor blade cartridges and methods of manufacture therefore in which the friction properties remain constant during the different use patterns of the user.

It is a further objective of the present invention to provide improved razor blades, razor blade cartridges and methods of manufacture therefore to provide an improved washthrough of the shaving debris and reduce the amount of water consumed during a shave.

According to a first aspect of the present invention there is provided a razor or razor blade cartridge including at least one razor blade and a housing made from a polymer material and comprising an outer surface wherein at least part of the housing is coated with a hydrophilic material, and wherein the outer surface of the housing comprises undulations on at least a portion of the coated part.

According to a further aspect of the present invention there is provided a razor or razor blade cartridge including at least one razor blade and a housing made from a polymer material and comprising an outer surface wherein at least part of the outer surface of the housing is coated with a hydrophilic material, and wherein the coating is formed from an acrylamide The razor blade cartridge may be a fixed non-electric wet shave blade cartridge with cutting blades or a rotating blade of an electric razor with shearing blades. In the case of an electric razor the blade may be arranged underneath a skin contacting foil. The undulated skin engaging surface will preferably be arranged adjacent to the blade.

There may be more than one blade, preferably five blades in the case of a fixed blade wet razor cartridge.

The undulations have a length dimension, a width dimension and a height dimension and they preferably extend longitudinally having a greater length than the height and width. The height is preferably defined by a lower trough surface and an upper crest surface joined by intervening side walls.

By means of the intervening side walls the undulations preferably provide an increased contact surface area between the first polymer and the coating such that for a given thickness the amount of polymer is greater than would be the case for a flat surface.

Preferably the coating is applied at a thickness which extends higher than the height of the undulations such that the troughs are completely filled with coating material. The coating may extend in thickness beyond the top of the crests of the undulations and may form a flat outer surface having a thickness above the crests and a greater thickness above the troughs corresponding to the depth of the troughs.

The depth dimension between the top of the crests and the bottom of the troughs may be within the range 0.01 to 1 0 mm and may advantageously be 0.05 to 0.5 mm, and is preferably within the range 0.1 to 0.2 mm.

The width dimension of the undulations, may be non-uniform that is to say that the width of the crest or ridge may be different to the width of the trough or the gap between ridges.

The width of the crest or ridge may be within the range 0.01 to 1 0 mm and may advantageously be 0.05 to 0.5 mm, and is preferably within the range 0.1 to 0.2 mm.

The trough width or gap between the ridges may be within the range 0.01 to 1.0 mm and may advantageously be 0.05 to 0.5 mm, and is preferably within the range 0.1 to 0.2 mm.

The coating has a thickness which extends beyond the top of the crest or ridge and this coating thickness may be within the range 0.01 to 1 0 mm and may advantageously be 0.05 to 0.5 mm, and is preferably within the range 0.1 to 0.2 mm.

The undulations may be formed in a straight configuration, or alternatively they may be curved or circular.

The first polymer material may be any suitable polymer as currently used to make razors or razor blade cartridges such as acrylonitrile butadiene styrene ABS, but also may be any vinyl polymers, nylons, carbonate polymers, aliphatic polymers or the like.

The housing may be made of a co moulding of a first polymer and a second separate and different polymer. The first co-moulded polymer may be a polymer to which the hydrophilic coating does not adhere very well whereas the second co-moulded polymer may be a polymer to which the hydrophilic coating does adhere very well.

The first co-polymer is preferably a glass filled nylon but also may be any vinyl polymers, nylons, carbonate polymers, aliphatic polymers or the like. The second co-polymer is preferably a TPU or TPE.

According to a further aspect of the present invention there is provided a method of manufacture of a razor blade cartridge including the steps of moulding a cartridge housing including undulated skin contacting surfaces of polymeric material; subsequently activating the undulated skin engaging surfaces of the polymer using either physical or chemical means to make the undulated surface receptive to the covalent grafting of a monomer, and then grafting a functional group onto the surface.

Preferably the functional group is an acrylamide, such as N-Isopropylacrylamide.

The physical activation means may be plasma treatment or the like. The chemical activation means may be exposing the surface to any medium to produce oxygen centred radicals in its surface; such as by exposure to ozone or a peroxidant such as peroxydisulphate in an aqueous solution.

Figure 2:
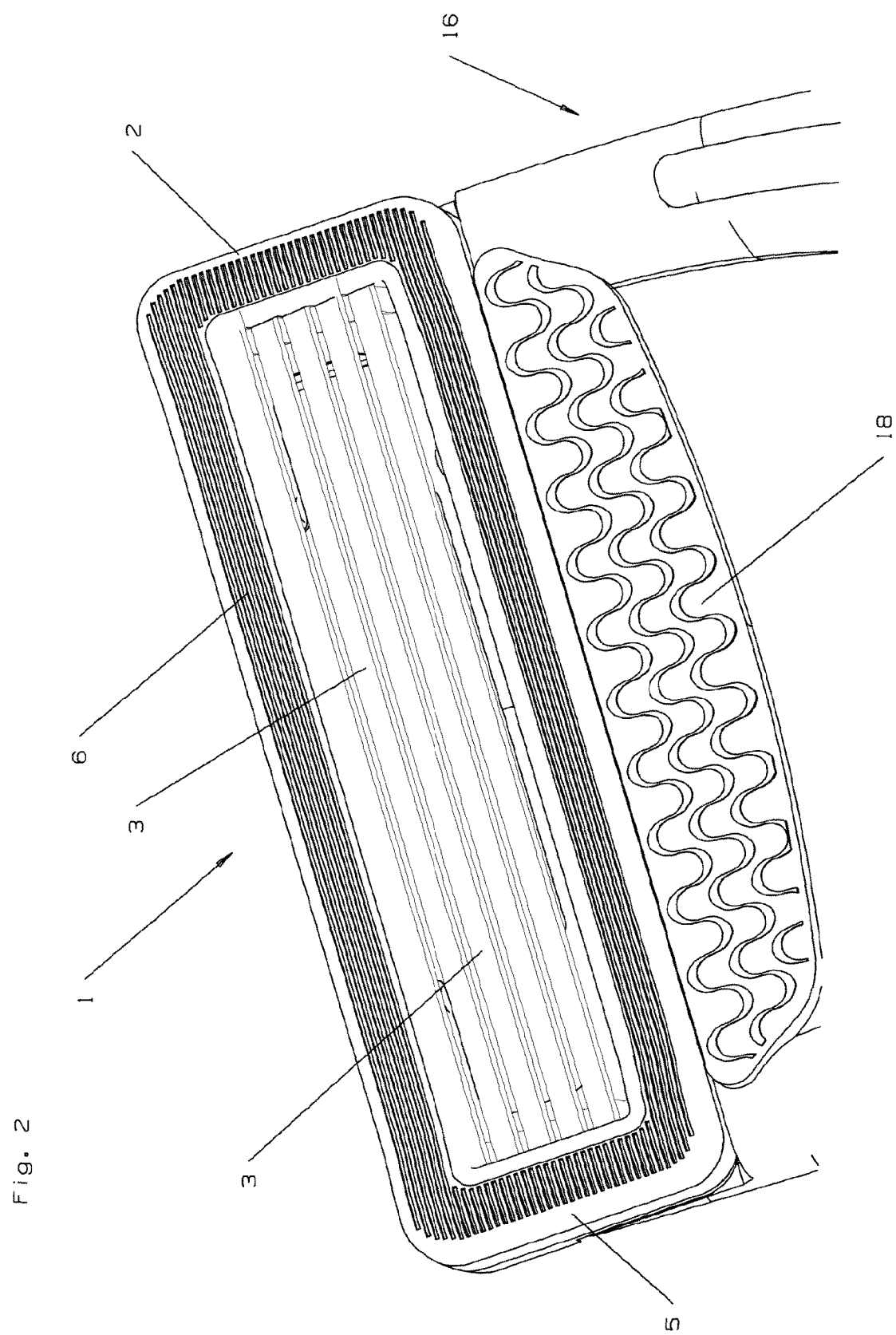
Figure 3:
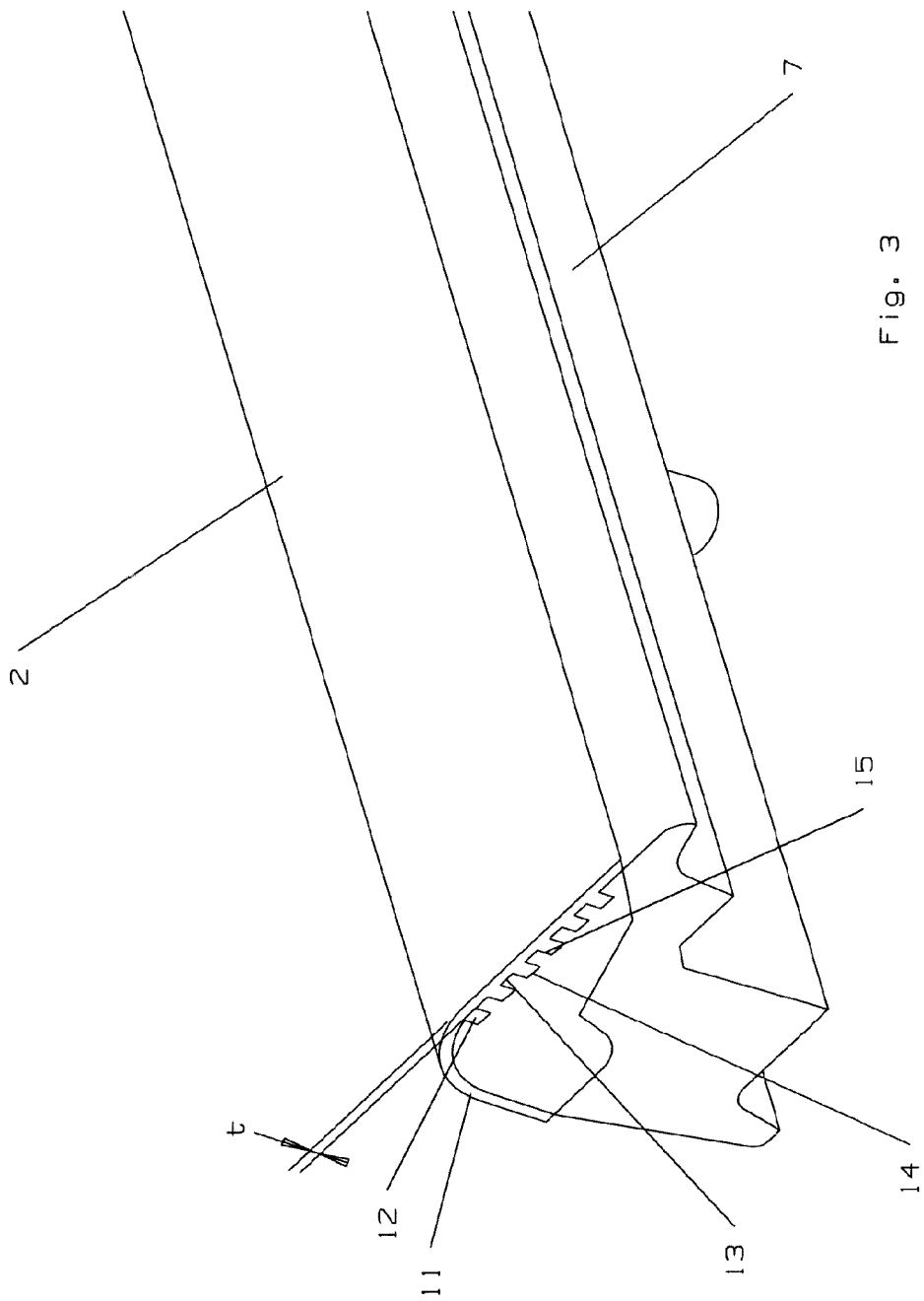
Figure 4:
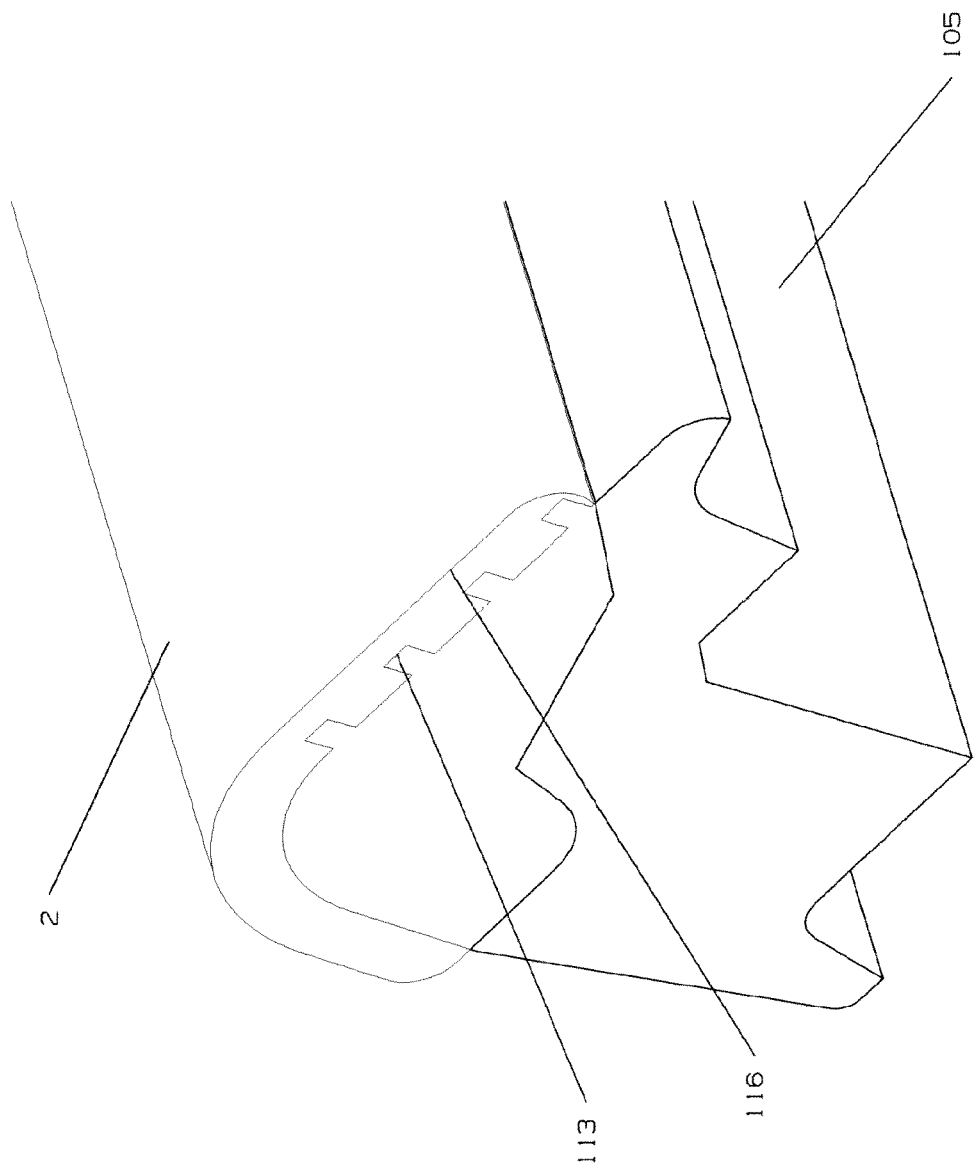
Figure 5:
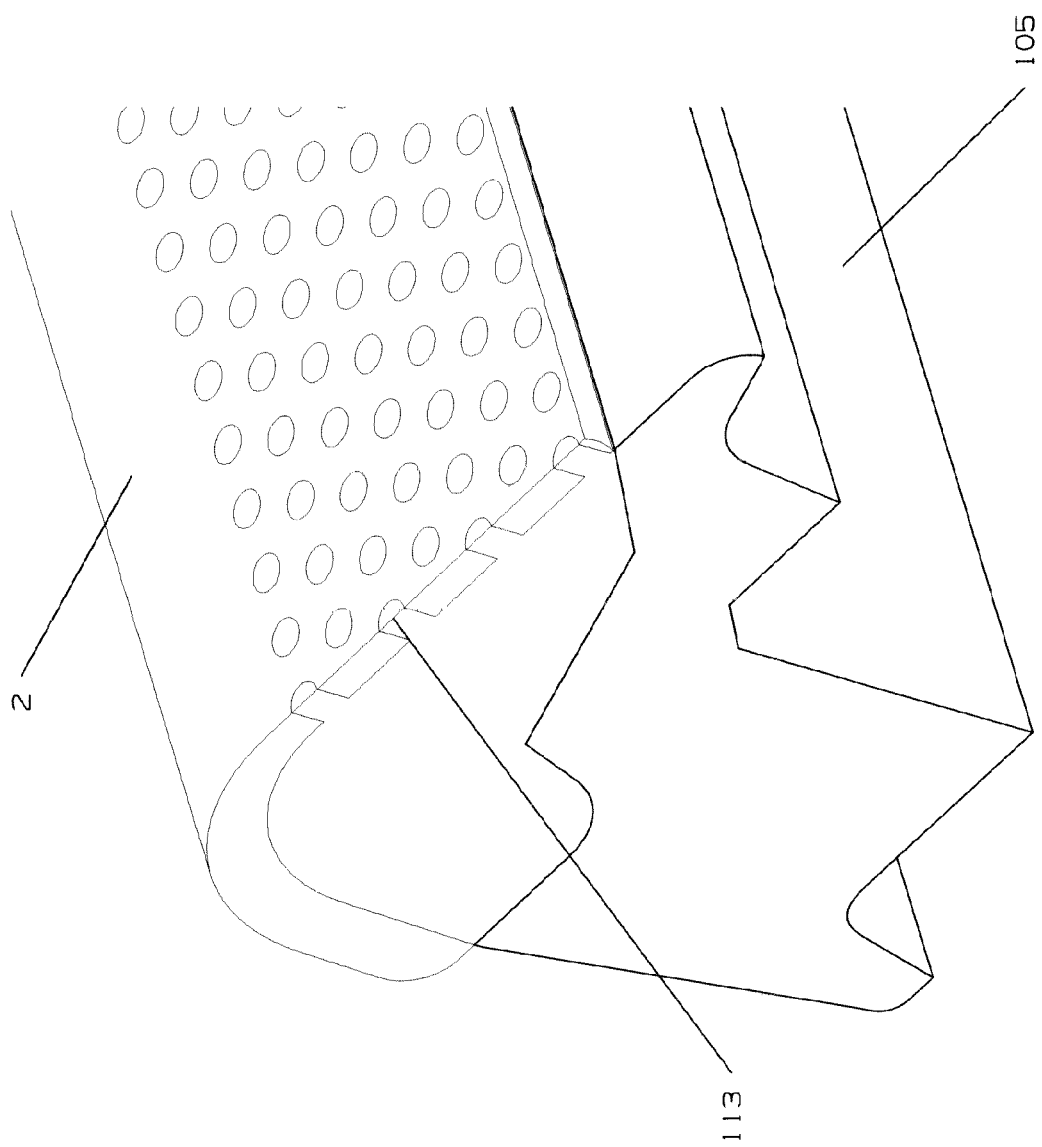
Figure 6:
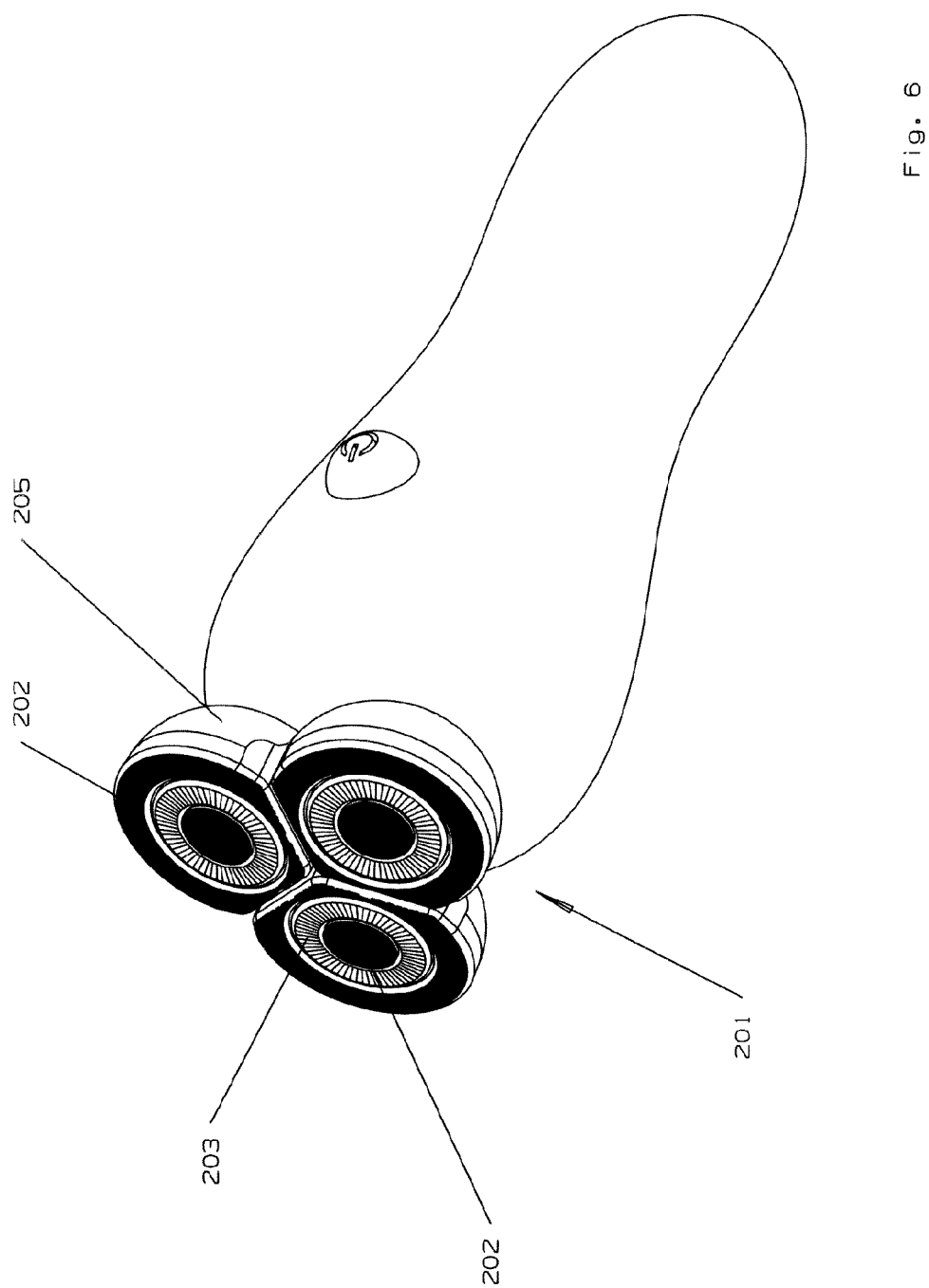

A number of embodiments on the present invention will now be described with reference to the figures in which:

FIG. 1 is a razor comprising a razor blade cartridge according to a first embodiment of the present invention, FIG. 2 shows an enlarged view the razor blade cartridge portion of the razor of FIG. 1, FIG. 3 shows a view of the skin contacting surface of the razor blade cartridge portion of FIG. 2 enlarged further, FIG. 4 shows an enlarged view of an alternative embodiment of the skin contacting surface of the razor blade cartridge portion, FIG. 5 shows an enlarged view of an alternative embodiment of the skin contacting surface of the razor blade cartridge portion as in FIG. 4 after use of the razor blade cartridge has commenced, FIG. 6 shows an alternative embodiment of the present invention of an electrically powered rotating blade razor, FIG. 7 shows an enlarged view the electric razor blade cartridge portion of the razor of FIG. 6, FIG. 8 shows a view of the skin contacting surface of the electric razor blade cartridge portion of FIG. 6 enlarged further, FIG. 9 shows an alternative embodiment of the razor cartridge portion of a wet razor of the present invention, FIG. 10 shows an under part of the razor cartridge in FIG. 9 with a second co-moulding shot not shown, FIG. 11 shows a break out side cross-sectional view of the unassembled components of the razor cartridge of FIG. 9, and FIG. 12 shows side cross sectional view of the razor cartridge of FIG. 9.

In a first embodiment of the present invention, shown in FIG. 1 to FIG. 3, a razor blade cartridge 1 includes a cartridge housing 5 including skin engaging surfaces 2 and razor blades 3. In this embodiment there are five blades, although any number of blades could be used.

The housing 5 is moulded from acrylo-nitrile butadiene styrene (ABS). ABS is a very common commercially available polymer and it will be appreciated that any other suitable polymer having the required properties of a razor blade cartridge may be used. The housing 5 and blade set 3 components of the razor blade cartridge 1 are made separately and assembled together to form the complete razor blade cartridge. The cartridge housing 5 is injection moulded and then treated to form a highly lubricious hydrophilic coating which has a very low friction of drag effect on the user's skin.

In alternative embodiments of the present invention the material selected for the razor blade cartridge is an elastomeric material, preferably selected from one of the materials:

Texin RxT90A, a tradename of Bayer Material Science AG
Hardness 30D (Scale D Rockwell hardness)
Tensile strength 40.7 MPA
Flexural Modulas 41.4 MPA
Type: TPU (Thermoplastic polyurethane), polyether based.
Pearlthane D16N60D, a tradename of Merquinsa.
Hardness: 63D
Tensile Strength: 40 MPA
Type: TPU, Polyester Based
Pearlthane 11t65D, a tradename of Merquinsa
Hardness: 64D
Tensile Strength: 35 MPA
Type: TPU, Polycaprolactone copolyester based
Pebax 7033, a tradename of Arkema
Hardness 69D (Scale D Rockwell hardness)
Tensile strength 57.2 MPA
Flexural Modulas 462 MPA
Type: TPE, Made from flexible polyether and rigid polamide.
Pebax 7233
Hardness 72D (Scale D Rockwell hardness)
Tensile strength 63.5 MPA Flexural Modulas 738 MPA
Type: TPE, made from flexible polyether and rigid polamide.
Texin HM1206
Hardness 85D (Scale D Rockwell hardness) Tensile strength 76 MPA
Flexural Modulas 2321 MPA
Type: TPU, Polyester Based Before assembly of the razor blade cartridge 1 to the blades 3, the cartridge housings 5 are provided with a coating 11 by a suitable process such as plasma activation. Such weakly ionised oxygen plasma treatment is a known technique for the activation of polymers in general and is used for example in the chrome plating of plastics for example for the car industry.

Following activation the coating is grafted on by exposure to the coating material. A suitable coating material is N-Isopropylacrylamide—97%, which is commercially available from Sigma-Aldrich under product number 415324. N-Isopropylacrylamide has the following specification:

Specification of N-Isopropylacrylamide—97%:
Formula: C6H11NO
Appearance: powder or crystals or flakes
Colour (APHA): white to off-white or faint yellow.
Solubility (5% in toluene): clear.

Referring now to FIG. 3 there is an enlarged view of a skin contacting surface portion of the razor blade cartridge comprising a housing base part 7 made from a first polymer material of ABS and a coating layer 11 comprising the hydrophilic material. In this embodiment the housing base part 7 comprises an array of undulations 12 comprising crests or ridges 13 and intervening troughs or gaps 14.

The undulations 12 have a length dimension, a width dimension and a height dimension and in this embodiment they extend longitudinally and parallel to each other and having a significantly greater length than the height and width.

The height of the undulations is defined the distance by a lower trough surface 14 and an upper crest surface 13 joined by intervening side walls 15.

By means of the intervening side walls 15 the undulations preferably provide an increased contact surface area between the first polymer and the coating polymer.

In this embodiment the coating is applied at a thickness which extends higher than the height of the undulations 12 such that the troughs 14 are completely filled with coating material. The coating also extends in thickness beyond the top of the crests 13 of the undulations 12 and forms a flat outer surface having a thickness above the crests 13 and a greater thickness above the troughs 14 corresponding to the depth of the troughs 14.

The depth dimension between the top of the crests and the bottom of the troughs in this embodiment is uniformly 0.15 mm, but may be within the range 0.01 to 1.0 mm and may advantageously be 0.05 to 0.5 mm, and is preferably within the range 0.1 to 0.2 mm.

The width of the crest or ridge in this embodiment is uniformly 0.15 mm, but may be within the range 0.01 to 1.0 mm and may advantageously be 0.05 to 0.5 mm, and is preferably within the range 0.1 to 0.2 mm.

The trough width or gap between the ridges in this embodiment is uniformly 0.15 mm but may be within the range 0.01 to 1.0 mm and may advantageously be within the range 0.05 to 0.5 mm and is preferably within the range 0.1 to 0.2 mm.

The coating has a thickness which extends beyond the top of the crest or ridge and this coating thickness in this embodiment is uniformly 0.15 mm, but may be within the range 0.01 to 1.0 mm and may advantageously be 0.05 to 0.5 mm, and is preferably within the range 0.1 to 0.2 mm.

The width dimension of the undulations 12, may be non-uniform that is to say that the width of the crest or ridge may be different to the width of the trough or the gap between ridges and the ridge or gap width, height, and thickness may vary on different portions of the skin contacting surface 6.

Referring now to FIG. 4, a further embodiment is shown in which the undulations, formed on a housing part 105, are not formed in a straight configuration but instead are uniformly circular. Correspondingly the length is not greater than the width but is equal to it. That is to say the top surface of the crest 113 is circular and has a diameter of 0.15 mm. The corresponding troughs are formed of the remaining shape surrounding the circular crests 113.

The depth of the crests 113 in this embodiment is uniformly 0.15 mm, but may be within the range 0.01 to 1.0 mm and may advantageously be 0.05 to 0.5 mm, and is preferably within the range 0.1 to 0.2 mm.

The trough width or gap between crests or ridges 113 in this embodiment is uniformly the surface area remaining when the crests are spaced apart by 0.30 mm between their centres but may be within the range 0.02 to 2.0 mm and may advantageously be 0.10 to 1.0 mm, and is preferably within the range 0.2 to 0.4 mm.

The coating has a thickness (t), which extends beyond the top of the crests 113 and this coating thickness in this embodiment is uniformly 0.15 mm, but may be within the range 0.01 to 1.0 mm and may advantageously be 0.05 to 0.5 mm, and is preferably within the range 0.1 to 0.2 mm.

Referring now to FIG. 5, the skin contacting surface portion of the razor head cartridge of FIG. 4 is shown following several days of use by a user. The precise number of days of use is not possible to predict due to the large variation in skin types, however it can be seen that the top layer 116 of the coating, which is unsupported by the undulations has completely worn away. What remains is the entirety of the coating which has been deposited in the troughs or gaps between the ridges 113. This remaining coating is present across a sufficient proportion of the skin contacting area, to continue to have a significant beneficial effect in providing a smooth friction free glide over the user's skin. This remaining coating is protected by the crests or ridges 113 and will remain protected and beneficial for the remaining life of the razor blade cartridge when the edges of the blades are worn out.

It has been found that it is additionally beneficial to have the layer of coating 116 on top of the crests 113 and to permit this layer to be gradually worn off by the first several uses of the cartridge since this improves the quality of the shave during these first several uses. This is believed to be as a result of a complex interaction between the wearing of the coating material the friction effect of the coating itself and the initial sharpness profile of the blade edges and the geometry of the blades in relation to the contacting surfaces and each other.

In a further embodiment the skin contacting components of an electric dry shaver as shown in FIGS. 6-8, are formed according to the present invention. It has become apparent that some users prefer to use electrically powered shavers in the wet environment of a shower or by a basin. Such shaving can no longer accurately be called by shaving, and is instead more accurately referred to as electrically powering shaving. The inventor has discovered that whilst shaving using an electrically powered shaver, in which shearing, rather than cutting, blades are completely protected by a foil, significant beneficial effects are achieved by coating the skin contacting parts of the powered shaver with the method of the present invention. The electric dry shaver comprises a razor body and a razor head 201, and the razor head 201 comprises a housing 205 skin contacting portions 202 and at least one blade part 203. The blade parts are rotating electrically driven blades located behind skin contacting foils. The skin contacting surfaces 202 are arranged concentrically inside and outside the blade parts 203.

Referring specifically to FIG. 8 it can be seen that the skin contacting parts 202 both inside and outside the blade parts 203 comprise corresponding ridges 213 and troughs 212 which have a relatively large length dimension and run concentrically around the blade parts and each other and are in parallel with each other forming discrete rows. The ridge width and gap or trough width are the same as described in the previous embodiment in FIGS. 1 to 5, as are the ridge depth and also the thickness of the coating which fills the troughs and also extends as a uniformly flat layer above the ridges.

An alternative embodiment of the wet razor of FIG. 1 is shown in FIGS. 9 to 12 the razor cartridge 301 is made from first and second materials in a two shot moulding process. The first material being relatively less receptive to the subsequent coating process than the second material. In this embodiment a first material is made from a polymer which is less responsive to the activation and grafting stages described above and results in its surface becoming coated with a lower thickness of the hydrophilic material whereas the second material is made from a polymer which is more responsive to the subsequent activation and or grafting stages its surface becomes coated with a greater amount of the hydrophilic polymer coating. Referring to FIG. 9 the lower portion 306 of the housing 305 is a first co-moulding shot made from a first material, in this case a glass filled nylon, and the upper portion 304 of the housing 305 is the second co-moulding shot of a second material, in this case Pebax 5533.

Details of Pebax 5533 are:
Pebax 5533, a tradename of Arkema
Hardness 55 (Shore D Durometer hardness)
Tensile strength (beak) 44.0 MPA
Flexural Modulas 165 MPA The lower portion 306 and the upper portion 304 being co-moulded to form the housing 305. Any suitable material may be chosen for the first material as an alternative to glass filled nylon provided it has sufficient rigidity and provided it is less receptive to the subsequent hydrophilic coating than the second material. Suitable materials for the second material are polymers which bond to the first material and which are more receptive to the subsequent hydrophilic polymer coating than the first material such as Pebax 5533 and other TPUs and TPEs.

FIG. 10 shows the lower portion 306 made from the relatively less receptive material and includes the means of attachment 307 to a razor handle.

FIG. 11 shows the components of the razor blade cartridge unassembled and the housing 305 including the co-moulded lower portion 306, and upper portion 304, a trimming blade 309, an aluminium sacrificial anode element 308, a blade set 303, and a rear cover 310 which holds the assembly together. These are shown assembled together in FIG. 12.

As an alternative to using a two shot co-moulded housing, it will also be appreciated that it would be possible to mask those parts of the razor cartridge, or for that matter the razor handle, that aren't desired to be treated either from the activation stage, or the grafting stage, or both.

Consequently selected parts of the razor blade cartridge are coated with hydrophilic coating, which are usefully, although not exclusively, the skin engaging parts.

Referring once more to FIG. 1, it will be appreciated that it is also possible for there to be skin engaging surfaces 18 which are permanently affixed to what is normally referred to as the razor handle 16. In this case it is perfectly possible within the scope of the present invention for the razor handles to take the place of the housing in the first embodiment. In this case however it would be essential that the razor handles are in two part form and only one of the two parts will be subject to activation and grafted of the hydrophilic coating of the present invention. The other part remaining untreated and preferably made from a highly gripable polymer. A razor handle made entirely of treated polymer would cause difficulties in the user being able to grip and hold the handle effectively.

Further embodiments include alternative methods for the activation stage which include corona discharge or ozone treatment or chemical activation means such as peroxy disulphates. With chemical activation means an additional drying step would be required before the grafting stage.

Additionally further embodiments include the grafting of alternative vinyl monomers with similar suitable highly hydrophilic properties such as any acrylamide, or a mixture of other monomers copolymerizable with the acrylamide.

It will be appreciated that the lateral arrays of undulations on the skin contacting surfaces may have any suitable shape or pattern from a wide variety of shapes and patterns in addition to those described herein and still achieve the objects of the present invention. The term undulations is to be understood to mean in its very general sense any textured surface which a series of higher and lower portions in the dimensions referred to herein in any array either uniformly or randomly arranged.

In the above specific embodiments the undulations are formed by moulding of the housing part but the required undulations or textured surface could be formed by other suitable means such as etching or by the process to prepare the surface for grafting of the hydrophilic coating.

Furthermore since the razor head has different skin contacting parts a first skin contacting part may have a dissimilar pattern and dimensions or ridge height, length, width and gap than those for a second or subsequent skin contacting part of the same razor head.

Every document cited herein, including any cross referenced or related patent or patent application is hereby incorporated herein by reference in its entirety unless expressly excluded or otherwise limited. The citation of any document is not an admission that it is prior art with respect to any present invention disclosed or claimed herein or that it alone, or in any combination with any other reference or references, teaches, suggests or discloses any such present invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the present invention. It is therefore intended to cover in the appended claims all such changes and modifications that are within the scope of the present invention.

The invention claimed is:

1. A razor blade cartridge including at least one razor blade and a housing made from a polymer material having an outer surface, at least part of the outer surface of the housing is coated with a hydrophilic material forming a coating, the outer surface of the housing including undulations, the undulations including an array of troughs and crests, a height of the undulations being defined by a lower trough surface and an upper crest surface, at least a portion of the coated part is disposed on the undulations such that a thickness of the coating extends higher than the height of the undulations and completely fills each of the troughs.

2. The razor blade cartridge according to claim 1, wherein the coating is formed from a vinyl monomer.

3. The razor blade cartridge according to claim 2, wherein the coating is formed from an acrylamide.

4. The razor blade cartridge according to claim 1, wherein the undulations are arranged adjacent to the at least one blade.

5. The razor blade cartridge according to claim 1, wherein each of the undulations include intervening side walls joining the lower trough surfaces and the upper crest surfaces and defining a width of each of the undulations.

6. The razor blade cartridge according to claim 5, wherein the undulations extend longitudinally having a length greater than the height and the width thereof.

7. The razor blade cartridge according to claim 5, wherein the intervening side walls of the undulations provide an increased contact surface area between the polymer material and the coating such that for a given hydrophilic coating thickness the amount of hydrophilic material is greater than would be the case for a flat surface.

8. The razor blade cartridge according to claim 5, wherein the hydrophilic coating extends in thickness beyond the upper crest surface and forms a flat outer surface having a thickness above the crests of the undulations and a greater thickness above the troughs of the undulations corresponding to a depth of the troughs of the undulations.

9. The razor blade cartridge according to claim 8, wherein the thickness of the coating extends beyond a top of the upper crest surface of the undulations within the range 0.01 to 1.0 mm.

10. The razor blade cartridge according to claim 9, wherein the coating thickness is 0.05 to 0.5 mm.

11. The razor blade cartridge according to claim 10, wherein the coating thickness is within the range 0.1 to 0.2 mm.

12. The razor blade cartridge according to claim 5, wherein the depth between the upper crest surface and the bottom of the troughs of the undulations is within the range 0.01 to 1.0 mm.

13. The razor blade cartridge according to claim 12, wherein the depth between the top of the crests of the undulations and the bottom of the troughs of the undulations is within the range 0.05 to 0.5 mm.

14. The razor blade cartridge according to claim 13, wherein the depth between the top of the crests of the undulations and the bottom of the troughs of the undulations is within the range 0.1 to 0.2 mm.

15. The razor blade cartridge according to claim 5, wherein the width of the crests of the undulations is within the range 0.01 to 1.0 mm.

16. The razor blade cartridge according to claim 5, wherein the width of the crests of the undulations is within the range 0.05 to 0.5 mm.

17. The razor blade cartridge according to claim 5, wherein the width of the crests of the undulations is within the range 0.1 to 0.2 mm.

18. The razor blade cartridge according to claim 5, wherein the width of the troughs of the undulations between the crests of the undulations is within the range 0.01 to 1.0 mm.

19. The razor blade cartridge according to claim 5, wherein the width of the troughs of the undulations between the crests is within the range 0.05 to 0.5 mm.

20. The razor blade cartridge according to claim 5, wherein the width of the troughs of the undulations between the crests is within the range 0.1 to 0.2 mm.

21. The razor blade cartridge according to claim 1, wherein the undulations are arranged in straight lines.

22. The razor blade cartridge according to claim 1, wherein the undulations are arranged in curved lines.

23. The razor blade cartridge according to claim 1, wherein the undulations are arranged as discrete circular protrusions.

24. The razor blade cartridge according to claim 1, wherein the coating is formed on the polymer material following modification of the outer surface by functionalization.

25. The razor blade cartridge according to claim 1, wherein the housing is made of a co-molding of a first polymer and a second, different polymer.

26. The razor blade cartridge according to claim 25, wherein the hydrophilic coating adheres differently to the second polymer than the first polymer, resulting in a coating thickness on the second polymer greater than the coating thickness on the first polymer.

27. The razor blade cartridge according to claim 1, wherein the razor blade cartridge is a non-rotating cutting blade cartridge.

28. The razor blade cartridge according to claim 1, wherein the razor blade cartridge is a rotating shearing blade cartridge.

29. A razor blade cartridge including at least one razor blade and a housing made from a polymer material and having an outer surface, the outer surface being textured, the outer textured surface including a series of gaps and crests, wherein at least part of the outer surface of the housing is coated with a hydrophilic material forming a coating, and the hydrophilic material, being formed from an acrylamide, is disposed upon the textured outer surface of the housing such that a thickness of the coating completely fills the series of gaps and extends higher than a height of each one of the crests.

30. A method of manufacture of a razor blade cartridge comprising the steps of: providing a cartridge housing formed of polymeric material and including a skin contacting surface; activating the skin contacting surface of the polymeric material using either physical or chemical means to make the skin contacting surface of polymeric material receptive to grafting; grafting a monomer upon the activated skin contacting surface, and subsequently grafting an acrylamide onto the activated skin contacting surface such that the coating extends higher than an array of undulations formed in the skin contacting surface and completely fills a series of gaps created by the undulations.

31. The method of manufacture of a razor blade cartridge according to claim 30, wherein the undulations are provided by molding of the cartridge housing.

32. The method of manufacture of a razor blade cartridge according to claim 30, wherein the undulations are provided by the activation process.

33. The method of manufacture of a razor blade cartridge according to claim 30, wherein the step of providing the cartridge housing includes providing a first material and a second material, the undulations being provided in a two-shot molding process by molding the second material separately from the first material.

34. The method of manufacture of a razor blade cartridge according to claim 30, wherein the acrylamide is a N-Isopropylacrylamide.

* * * * *